(12) United States Patent
Lee et al.

(10) Patent No.: US 10,107,370 B1
(45) Date of Patent: Oct. 23, 2018

(54) PLANETARY GEAR TRAIN OF AUTOMATIC TRANSMISSION FOR VEHICLES

(71) Applicants: HYUNDAI MOTOR COMPANY, Seoul (KR); KIA MOTORS CORPORATION, Seoul (KR)

(72) Inventors: Kyeong Hun Lee, Seoul (KR); Jong Sool Park, Hwaseong-si (KR); Jong Soo Kim, Seoul (KR); Dong Hwan Hwang, Seoul (KR); Jin Ho Kim, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 15/709,944

(22) Filed: Sep. 20, 2017

(30) Foreign Application Priority Data

Apr. 24, 2017 (KR) .......................... 10-2017-0052121

(51) Int. Cl.
*F16H 37/04* (2006.01)
*F16H 3/66* (2006.01)

(52) U.S. Cl.
CPC ............. *F16H 37/04* (2013.01); *F16H 3/666* (2013.01); *F16H 2037/048* (2013.01); *F16H 2200/006* (2013.01); *F16H 2200/2012* (2013.01); *F16H 2200/2043* (2013.01)

(58) Field of Classification Search
CPC . F16H 37/04; F16H 3/666; F16H 3/44; F16H 3/2037
See application file for complete search history.

(56) References Cited

U.S. PATENT DOCUMENTS

| 8,113,978 | B2 * | 2/2012 | Phillips | F16H 3/666 475/210 |
| 9,777,804 | B2 * | 10/2017 | Lee | F16H 3/66 |
| 9,897,176 | B2 * | 2/2018 | Lee | F16H 3/666 |
| 9,951,848 | B2 * | 4/2018 | Lee | F16H 3/663 |
| 2009/0098969 | A1 * | 4/2009 | Tabata | B60K 6/365 475/5 |

* cited by examiner

*Primary Examiner* — Jacob S. Scott
*Assistant Examiner* — Tinh Dang
(74) *Attorney, Agent, or Firm* — Brinks Gilson & Lione (57) ABSTRACT

A planetary gear train of an automatic transmission provides at least eight forward speeds and one reverse speed by combination of: first to fourth planetary gear sets respectively having first to third rotational elements, fourth to sixth rotational elements, seventh to ninth rotational elements or tenth to twelfth rotational elements; two transfer gears and five control elements selectively connecting one shaft to another shaft selected from first to tenth shafts or to a transmission housing. In particular, an input shaft is mounted with the first, second and third planetary gear sets, an output shaft is mounted with the fourth planetary gear set, the eighth shaft is fixedly connected with the tenth rotational element and externally engaged with the sixth shaft via one of the two transfer gears; the tenth shaft is fixedly connected with the twelfth rotational element and externally engaged with the fourth shaft via the other transfer gear.

17 Claims, 4 Drawing Sheets

| Shift-stage | Clutch | | | Brake | | Gear ratio | Step ratio | Remark |
|---|---|---|---|---|---|---|---|---|
| | C1 | C2 | C3 | B1 | B2 | | | |
| REV |  |  | ● | ● | ● | -2.954 | - | |
| N | ● |  |  | ● | ● | - | - | |
| D1 | ● | ● |  | ● | ● | 4.820 | 1.457 | |
| D2 |  | ● |  | ● | ● | 3.309 | 1.462 | Gear ratio span : 7.01 |
| D3 |  | ● | ● |  | ● | 2.263 | 1.296 | Ratio of REV vs D1 : -0.61 |
| D4 | ● |  | ● |  | ● | 1.746 | 1.309 | |
| D5 | ● | ● | ● |  | ● | 1.334 | 1.334 | |
| D6 | ● |  | ● |  |  | 1.000 | 1.190 | |
| D7 |  |  | ● | ● |  | 0.840 | 1.223 | |
| D8 |  | ● | ● | ● |  | 0.687 |  | |

PLANETARY GEAR TRAIN OF AUTOMATIC TRANSMISSION FOR VEHICLES

CROSS-REFERENCE TO RELATED APPLICATION

This application claims priority to and the benefit of Korean Patent Application No. 10-2017-0052121, filed on Apr. 24, 2017, which is incorporated herein by reference in its entirety.

FIELD

The present disclosure relates to an automatic transmission for a vehicle.

BACKGROUND

The statements in this section merely provide background information related to the present disclosure and may not constitute prior art.

Recently, increases of oil price has triggered more competition for enhancing fuel efficiency of a vehicle.

In this regards, research on an automatic transmission has been performed to provide better drivability and improve fuel efficiency by achieving more shift stages.

In order to achieve more shift stages for an automatic transmission, the number of parts is typically increased, which may negatively impact on installability, production cost, weight and/or power flow efficiency.

In order to increase fuel efficiency of an automatic transmission by more shift stages with reduced number of parts, an eight-speed automatic transmission has been recently introduced, and a planetary gear train for an automatic transmission enabling more shift stages has been developed.

An automatic transmission of eight or more shift-stages typically includes three to four planetary gear sets and five to six control elements (frictional elements), and may easily become lengthy, thereby undermining installability.

In this regard, disposing planetary gear sets in parallel or employing dog clutches instead of wet-type control elements is sometimes attempted. However, such an arrangement may not be widely applicable, and using dog clutches may easily deteriorate shift-feel.

SUMMARY

The present disclosure provides a planetary gear train of an automatic transmission for a vehicle having advantages of realizing at least eight forward speeds and at least one reverse speed by a combination of four planetary gear sets, two external gears and five control elements, thereby providing improvement of power delivery performance and fuel consumption and improving installability by reducing a length of the transmission.

In addition, a wide available range of gear teeth of transfer gears enables easily obtaining desired gear ratios for respective vehicles, thereby improving power delivery performance and fuel consumption.

A planetary gear train of an automatic transmission for a vehicle according to an exemplary form of the present disclosure may include: a first planetary gear set having first, second, and third rotational elements; a second planetary gear set having fourth, fifth, and sixth rotational elements; a third planetary gear set having seventh, eighth, and ninth rotational elements; a fourth planetary gear set having tenth, eleventh, and twelfth rotational elements; an input shaft mounted with the first, second, and third planetary gear sets at an external circumference of the input shaft; and an output shaft disposed in parallel with the input shaft and mounted with the fourth planetary gear set on external circumference of the output shaft; a first shaft fixedly connected with the first rotational element and the fourth rotational element; a second shaft fixedly connected with the second rotational element and connected with the input shaft; a third shaft fixedly connected with the third rotational element and the ninth rotational element; a fourth shaft fixedly connected with the fifth rotational element; a fifth shaft fixedly connected with the sixth rotational element; a sixth shaft fixedly connected with the seventh rotational element; a seventh shaft fixedly connected with the eighth rotational element; a eighth shaft fixedly connected with the tenth rotational element and externally engaged with the sixth shaft; a ninth shaft fixedly connected with the eleventh rotational element and connected with the output shaft; a tenth shaft fixedly connected with the twelfth rotational element and externally engaged with the fourth shaft; and two transfer gears externally gear-meshed with the fourth and sixth shafts respectively.

The first shaft may selectively act as a fixed element, the fifth shaft may selectively act as a fixed element, the sixth shaft may be selectively connected with the input shaft, and the seventh shaft may be selectively connected with the fourth shaft.

The first planetary gear set may include a first sun gear as the first rotational element, a first planet carrier as the second rotational element, and a first ring gear as the third rotational element; the second planetary gear set may include a second sun gear as the fourth rotational element, a second planet carrier as the fifth rotational element, and a second ring gear as the sixth rotational element; the third planetary gear set may include a third sun gear as the seventh rotational element, a third ring gear as the eighth rotational element, and a third planet carrier as the ninth rotational element; and the fourth planetary gear set may include a fourth sun gear as the tenth rotational element, a fourth planet carrier as the eleventh rotational element, and a fourth ring gear as the twelfth rotational element.

The first, second, third planetary gear sets may be arranged on the input shaft in the order of the third, first, and second planetary gear sets from an engine side.

The two transfer gear may include a first transfer gear arranged between the fourth shaft and the tenth shaft; and a second transfer gear arranged between the sixth shaft and the eighth shaft.

At least two rotational elements among the seventh, the eighth, and the ninth rotational elements of the third planetary gear set may be selectively connected to each other such that all rotational elements of the third planetary gear set may integrally rotate.

The planetary gear train may further include a first clutch arranged between the input shaft and the sixth shaft; a second clutch arranged between the sixth shaft and the seventh shaft; a third clutch arranged between the fourth shaft and the seventh shaft; a first brake arranged between the first shaft and a transmission housing; and a second brake arranged between the fifth shaft and the transmission housing.

The planetary gear train may further include a first clutch arranged between the input shaft and the sixth shaft; a second clutch arranged between the third shaft and the seventh shaft; a third clutch arranged between the fourth shaft and the seventh shaft; a first brake arranged between the first shaft and the transmission housing; and a second brake arranged between the fifth shaft and the transmission housing.

The planetary gear train may further include a first clutch arranged between the input shaft and the sixth shaft; a second clutch arranged between the third shaft and the sixth shaft; a third clutch arranged between the fourth shaft and the seventh shaft; a first brake arranged between the first shaft and the transmission housing; and a second brake arranged between the fifth shaft and the transmission housing.

According to a planetary gear train according to an exemplary form of the present disclosure, planetary gear sets are dividedly arranged on input and output shafts disposed in parallel, thereby reducing a length of the transmission and improving installability.

According to a planetary gear train according to an exemplary form of the present disclosure, at least eight forward speeds and at least one reverse speed may be realized by employing two transfer gears in addition to a combination of planetary gear sets, thereby providing a wide range of varying gear teeth so as to easily achieve desired gear ratios and to easily comply with desired performance for respective vehicles.

In addition, according to a planetary gear train according to an exemplary form of the present disclosure, it is possible to realize eight forward speeds and one reverse speed, thereby increasing an engine driving efficiency.

In addition, the linearity of step ratios of shift stages is secured while multi-staging the shift stage with high efficiency, thereby making it possible to improve drivability such as acceleration before and after a gear shift, an engine speed rhythmic sense, and the like.

In addition, five control elements are applied to the planetary gear train according to an exemplary form of the present disclosure, thereby making it possible to reduce material cost due to reduction of constituent components, and reduce non-controlled control elements so as to reduce a drag torque, and improve a power transmission efficiency so as to reduce fuel consumption.

Further, effects that can be obtained or expected from exemplary forms of the present disclosure are directly or suggestively described in the following detailed description. That is, various effects expected from exemplary forms of the present disclosure will be described in the following detailed description.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The present disclosure will be described more fully hereinafter with reference to the accompanying drawings, in which exemplary forms of the present disclosure are shown. As those skilled in the art would realize, the described forms may be modified in various different ways, all without departing from the spirit or scope of the present disclosure.

The drawings and description are to be regarded as illustrative in nature and not restrictive, and like reference numerals designate like elements throughout the present disclosure.

In the following description, dividing names of components into first, second and the like is to divide the names because the names of the components are the same as each other and an order thereof is not particularly limited.

Further, as used herein, description of elements being "fixedly" connected or interconnected includes elements that are directly connected, i.e. one element directly connected to another element for rotation therewith.

Figure 1:
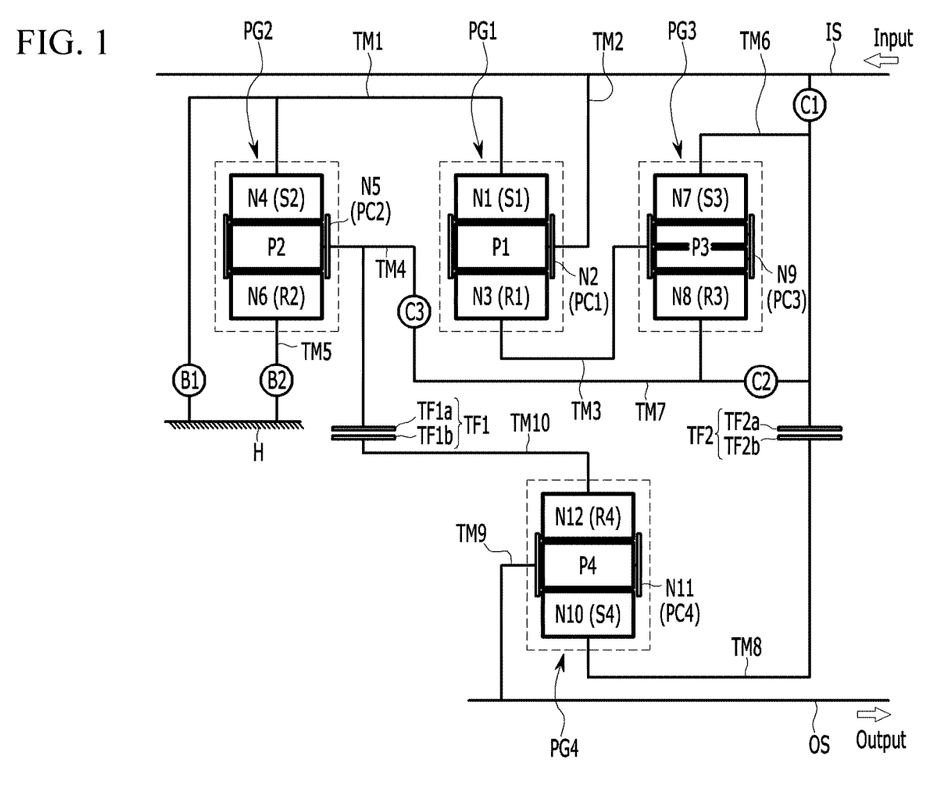
FIG. 1 is a schematic diagram of a planetary gear train according to a first exemplary form of the present disclosure.

FIG. 1 is a schematic diagram of a planetary gear train according to a first exemplary form of the present disclosure.

Referring to FIG. 1, a planetary gear train includes: an input shaft IS; an output shaft OS; first, second, third, and fourth planetary gear sets PG1, PG2, PG3, and PG4; two transfer gears TF1 and TF2; and control elements including three clutches C1, C2 and C3 and two brakes B1 and B2.

The input shaft IS is an input member and the torque from a crankshaft of an engine is input into the input shaft IS, after being torque-converted through a torque converter.

The output shaft OS is an output member, which is arranged in parallel with the input shaft IS, outputs a shifted driving torque to a drive shaft through a differential apparatus.

The first, second, and third planetary gear sets PG1, PG2, and PG3 are arranged at external circumference of the input shaft IS and form a main shifting portion. The first, second, third planetary gear set PG1, PG2, and PG3 are arranged on the input shaft IS in the order of the third, first, and second planetary gear set PG3, PG1, and PG2 from an engine side.

The fourth planetary gear set PG4 is arranged at external circumference of the output shaft OS disposed in parallel with the input shaft IS and forms an auxiliary shifting portion.

The first planetary gear set PG1 is a single pinion planetary gear set, and includes a first sun gear S1, a first planet carrier PC1 that supports a first pinion P1 externally engaged with the first sun gear S1, and a first ring gear R1 that is internally engaged with the first pinion P1. The first sun gear S1 acts as a first rotational element N1, the first planet carrier PC1 acts as a second rotational element N2, and the first ring gear R1 acts as a third rotational element N3.

The second planetary gear set PG2 is a single pinion planetary gear set, and includes a second sun gear S2, a second planet carrier PC2 that supports a second pinion P2 externally engaged with the second sun gear S2, and a second ring gear R2 that internally engaged with the second pinion P2. The second sun gear S2 acts as a fourth rotational element N4, the second planet carrier PC2 acts as a fifth rotational element N5, and the second ring gear R2 acts as a sixth rotational element N6.

The third planetary gear set PG3 is a double pinion planetary gear set, and includes a third sun gear S3, a third ring gear R3 that externally engaged with a third pinion P3 externally engaged with the third sun gear S3, and a third planet carrier PC3 that supports the third pinion P3. The third sun gear S3 acts as a seventh rotational element N7, the third ring gear R3 acts as an eighth rotational element N8, and the third planet carrier PC3 acts as a ninth rotational element N9.

The fourth planetary gear set PG4 is a single pinion planetary gear set, and includes a fourth sun gear S4, a fourth planet carrier PC4 that supports fourth pinion P4 externally engaged with the fourth sun gear S4, and a fourth ring gear R4 that internally engaged with the fourth pinion P4. The fourth sun gear S4 acts as a tenth rotational element N10, the fourth planet carrier PC4 acts as an eleventh rotational element N11, and the fourth ring gear R4 acts as a twelfth rotational element N12.

In the arrangement of the first, second, and third planetary gear sets PG1, PG2, and PG3, the first rotational element N1 is fixedly connected with the fourth rotational element N4, and the third rotational element N3 is fixedly connected with the ninth rotational element N9, by corresponding shafts selected from seven shafts TM1 to TM7.

Three shafts TM8 to TM10 are fixedly connected to the fourth planetary gear set PG4.

The ten shafts TM1 to TM10 are hereinafter described in detail.

Each of the ten shafts TM1-TM10 may be a rotational member that fixedly interconnects the input and output shafts and rotational elements of the planetary gear sets PG1, PG2, PG3, and PG4, may be a rotational member that selectively interconnects the rotational element and a transmission housing H, or may be a fixed member that fixedly connects the rotational element to the transmission housing H.

The first shaft TM1 is fixedly connected with the first rotational element N1 (first sun gear S1} and the fourth rotational element N4 (second sun gear S2), and selectively connected with the transmission housing H.

The second shaft TM2 is fixedly connected with the second rotational element N2 (first planet carrier PC1) and the input shaft IS, thereby always acting as an input element.

The third shaft TM3 is fixedly connected with the third rotational element N3 (first ring gear R1) and the ninth rotational element N9 (third planet carrier PC3).

The fourth shaft TM4 is fixedly connected with the fifth rotational element N5 (second planet carrier PC2).

The fifth shaft TM5 is fixedly connected with the sixth rotational element N6 (second ring gear R2), and selectively connected with the transmission housing H.

The sixth shaft TM6 is fixedly connected with the seventh rotational element N7 (third sun gear S3), and is selectively connected with the input shaft IS.

The seventh shaft TM7 is fixedly connected with the eighth rotational element N8 (third ring gear R3), and is selectively connected with the fourth shaft TM4 and the sixth shaft TM6 respectively.

The eighth shaft TM8 is fixedly connected with the tenth rotational element N10 (fourth sun gear S4), and is externally gear-meshed with the sixth shaft TM6.

The ninth shaft TM9 is fixedly connected with the eleventh rotational element N11 (fourth planet carrier PC4) and the output shaft OS, thereby always acting as an output element.

The tenth shaft TM10 is fixedly connected with the twelfth rotational element N12 (fourth ring gear R4), and is externally gear-meshed with the fourth shaft TM4.

The two transfer gears TF1 and TF2 deliver a shifted torque of the main shifting portion having the first, second, and third planetary gear sets PG1, PG2, and PG3 to the auxiliary shifting portion having the fourth planetary gear set PG4.

The first transfer gear TF1 includes a first transfer drive gear TF1a connected with the fourth shaft TM4, and a first transfer driven gear TF1b connected with the tenth shaft TM10, and the first transfer gear TF1 externally gear-meshes the fourth shaft TM4 and the tenth shaft TM10.

The second transfer gear TF2 includes a second transfer drive gear TF2a connected with the sixth shaft TM6, and a second transfer driven gear TF2b connected with the eighth shaft TM8, and the second transfer gear TF2 externally gear-meshes the sixth shaft TM6 and the eighth shaft TM8.

As a result, respective shafts connected by the first and second transfer gears TF1 and TF2 rotate in opposite directions, and the gear ratios of the first and second transfer gears TF1 and TF2 may be preset in consideration of desired speed ratio of the transmission.

The control elements include three clutches C1, C2, and C3 and two brakes B1 and B2, and are arranged as follows.

The first clutch C1 is arranged between the input shaft IS and the sixth shaft TM6 such that the input shaft IS and the sixth shaft TM6 may selectively connected with each other.

The second clutch C2 is arranged between the sixth shaft TM6 and the seventh shaft TM7 such that the sixth shaft TM6 and the seventh shaft TM7 may selectively connected with each other.

The third clutch C3 is arranged between the fourth shaft TM4 and the seventh shaft TM7 such that the fourth shaft TM4 and the seventh shaft TM7 may selectively connected with each other.

The first brake B1 is arranged between the first shaft TM1 and the transmission housing H such that the first shaft TM1 may selectively act as a fixed element.

The second brake B2 is arranged between the fifth shaft TM5 and the transmission housing H such that the fifth shaft TM5 may selectively act as a fixed element.

In the first exemplary form of the present disclosure, the second clutch C2 selectively connects the sixth shaft TM6 and the seventh shaft TM7. Herein, the second clutch C2 connects at least two rotational elements among the seventh, eighth, and ninth rotational elements N7, N8, and N9 of the third planetary gear set PG3 such that the first planetary gear set PG1 may integrally rotate. The second clutch C2 selectively connects two shafts among the third shaft TM3, the sixth shaft TM6, and the seventh shaft TM7, such that the third planetary gear set PG3 becomes locked and integrally rotates.

Herein, the control elements of the first, second and third clutches (C1, C2, and C3), and the first and second brakes (B1 and B2) as hydraulic friction coupling units which are operated by hydraulic pressure supplied from a hydraulic control device primarily adopt a wet multi-disk type hydraulic friction coupling unit. But the control elements may be constituted by a coupling unit such as a dog clutch, an electronic clutch and a magnetic particle clutch which may be operated according to an electric signal supplied from an electronic control device.

Figure 2:
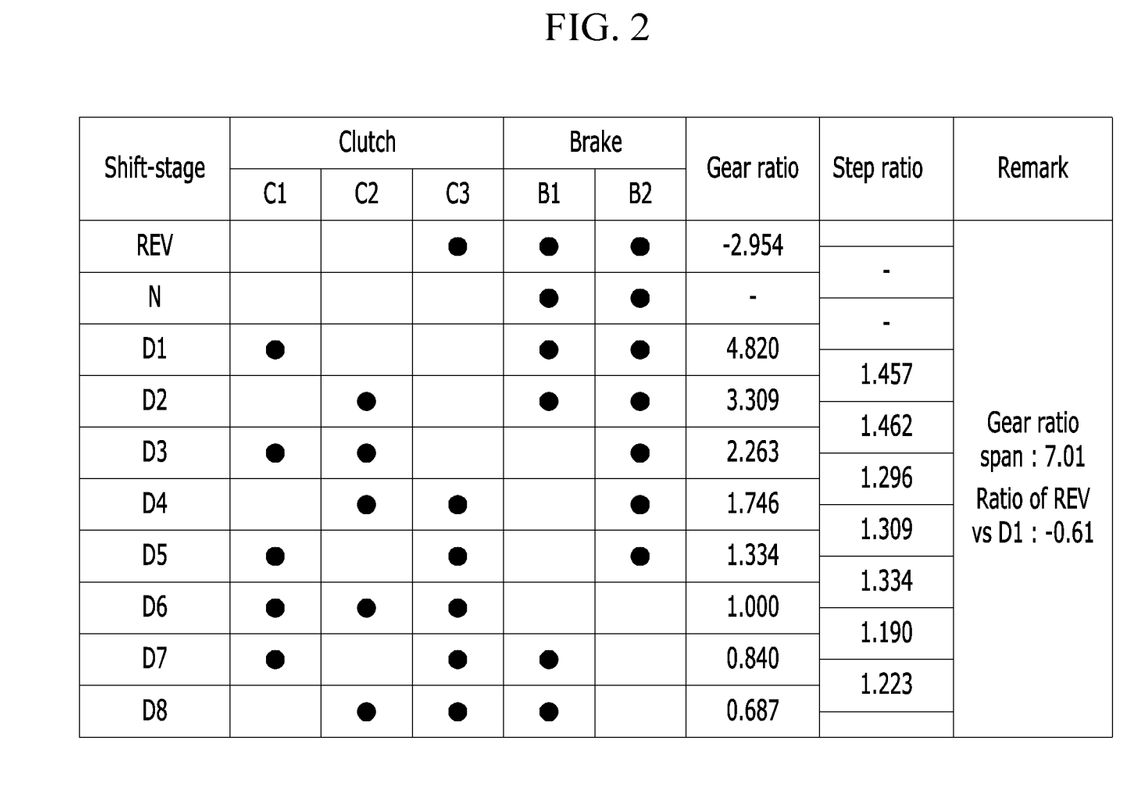
FIG. 2 is an operation chart for respective control elements at respective shift-stages in a planetary gear train according to an exemplary form of the present disclosure.

FIG. 2 is an operational chart for respective control elements at respective shift-stages in a planetary gear train according to a first exemplary form of the present disclosure.

Referring to FIG. 2, a planetary gear train according to a first exemplary form of the present disclosure realizes shifting by operating three control elements among the three clutches (C1, C2, and C3) and the two brakes (B1 and B2).

[The Forward First Speed]

In the forward first speed shift-stage D1, the first clutch C1 and the first and second brakes B1 and B2 are simultaneously operated.

As a result, the sixth shaft TM6 is connected with the input shaft IS by the operation of the first clutch C1. In this state, the torque of the input shaft IS is input to the second shaft TM2 and the sixth shaft TM6, and the first shaft TM1 and the fifth shaft TM5 act as a fixed element by the operation of the first brake B1 and the second brake B2, thereby realizing the forward first speed by operation of respective shafts and outputting a shifted torque to the output shaft OS connected with the ninth shaft TM9.

[The Forward Second Speed]

In the forward second speed shift-stage D2, the second clutch C2 and the first and second brakes B1 and B2 are simultaneously operated.

As a result, the sixth shaft TM6 is connected with the seventh shaft TM7 by the operation of the second clutch C2. In this state, the torque of the input shaft IS is input to the second shaft TM2, and the first shaft TM1 and the fifth shaft TM5 act as a fixed element by the operation of the first brake B1 and the second brake B2, thereby realizing the forward second speed by operation of respective shafts and outputting a shifted torque to the output shaft OS connected with the ninth shaft TM9.

[The Forward Third Speed]

In the forward third speed shift-stage D3, the first clutch C1, the second clutch C2 and the second brake B2 are simultaneously operated.

As a result, the sixth shaft TM6 is connected with the input shaft IS by the operation of the first clutch C1, and the sixth shaft TM6 is connected with the seventh shaft TM7 by the operation of the second clutch C2. In this state, the torque of the input shaft IS is input to the second shaft TM2 and the sixth shaft TM6, and the fifth shaft TM5 acts as a fixed element by the operation of the second brake B2, thereby realizing the forward third speed by operation of respective shafts and outputting a shifted torque to the output shaft OS connected with the ninth shaft TM9.

[The Forward Fourth Speed]

In the forward fourth speed shift-stage D4, the second C2, the third clutch C3, and the second brake B2 are simultaneously operated.

As a result, the sixth shaft TM6 is connected with the seventh shaft TM7 by the operation of the second clutch C2, and the fourth shaft TM4 is connected with the seventh shaft TM7 by the operation of the third clutch C3. In this state, the torque of the input shaft IS is input to the second shaft TM2, and the fifth shaft TM5 acts as a fixed element by the operation of the second brake B2, thereby realizing the forward fourth speed by operation of respective shafts and outputting a shifted torque to the output shaft OS connected with the ninth shaft TM9.

[The Forward Fifth Speed]

In the forward fifth speed shift-stage D5, the first C1, the third clutch C3, and the second brake B2 are simultaneously operated.

As a result, the sixth shaft TM6 is connected with the input shaft IS by the operation of the first clutch C1, and the fourth shaft TM4 is connected with the seventh shaft TM7 by the operation of the third clutch C3. In this state, the torque of the input shaft IS is input to the second shaft TM2 and the sixth shaft TM6, and the fifth shaft TM5 acts as a fixed element by the operation of the second brake B2, thereby realizing the forward fifth speed by operation of respective shafts and outputting a shifted torque to the output shaft OS connected with the ninth shaft TM9.

[The Forward Sixth Speed]

In the forward sixth speed shift-stage D6, the first clutch C1, the second clutch C2, and the third clutch C3 are simultaneously operated.

As a result, the sixth shaft TM6 is connected with the input shaft IS by the operation of the first clutch C1, the sixth shaft TM6 is connected with the seventh shaft TM7 by the operation of the second clutch C2, and the fourth shaft TM4 is connected with the seventh shaft TM7 by the operation of the third clutch C3. In this state, the torque of the input shaft IS is input to the second shaft TM2 and the sixth shaft TM6, thereby realizing the forward sixth speed by operation of respective shafts and outputting a shifted torque to the output shaft OS connected with the ninth shaft TM9.

[The Forward Seventh Speed]

In the forward seventh speed shift-stage D7, the first clutch C1, the third clutch C3, and the first brake B1 are simultaneously operated.

As a result, the sixth shaft TM6 is connected with the input shaft IS by the operation of the first clutch C1, and the fourth shaft TM4 is connected with the seventh shaft TM7 by the operation of the third clutch C3. In this state, the torque of the input shaft IS is input to the second shaft TM2 and the sixth shaft TM6, and the first shaft TM1 acts as a fixed element by the operation of the first brake B1, thereby realizing the forward seventh speed by operation of respective shafts and outputting a shifted torque to the output shaft OS connected with the ninth shaft TM9.

[The Forward Eighth Speed]

In the forward eighth speed shift-stage D8, the second clutch C2, the third clutch C3, and the first brake B1 are simultaneously operated.

As a result, the sixth shaft TM6 is connected with the seventh shaft TM7 by the operation of the second clutch C2, and the fourth shaft TM4 is connected with the seventh shaft TM7 by the operation of the third clutch C3. In this state, the torque of the input shaft IS is input to the second shaft TM2, and the first shaft TM1 acts as a fixed element by the operation of the first brake B1, thereby realizing the forward eighth speed by operation of respective shafts and outputting a shifted torque to the output shaft OS connected with the ninth shaft TM9.

[The Reverse Speed]

In the reverse speed shift-stage REV, the third clutch C3, the first brake B1, and the second brake B2 are simultaneously operated.

As a result, the fourth shaft TM4 is connected with the seventh shaft TM7 by the operation of the third clutch C3. In this state, the torque of the input shaft IS is input to the second shaft TM2, the first shaft TM1 and the fifth shaft TM5 act as fixed element by the operation of the first brake B1 and the second brake B2, thereby realizing the reverse speed by operation of respective shafts and outputting a shifted torque to the output shaft OS connected with the ninth shaft TM9.

Figure 3:
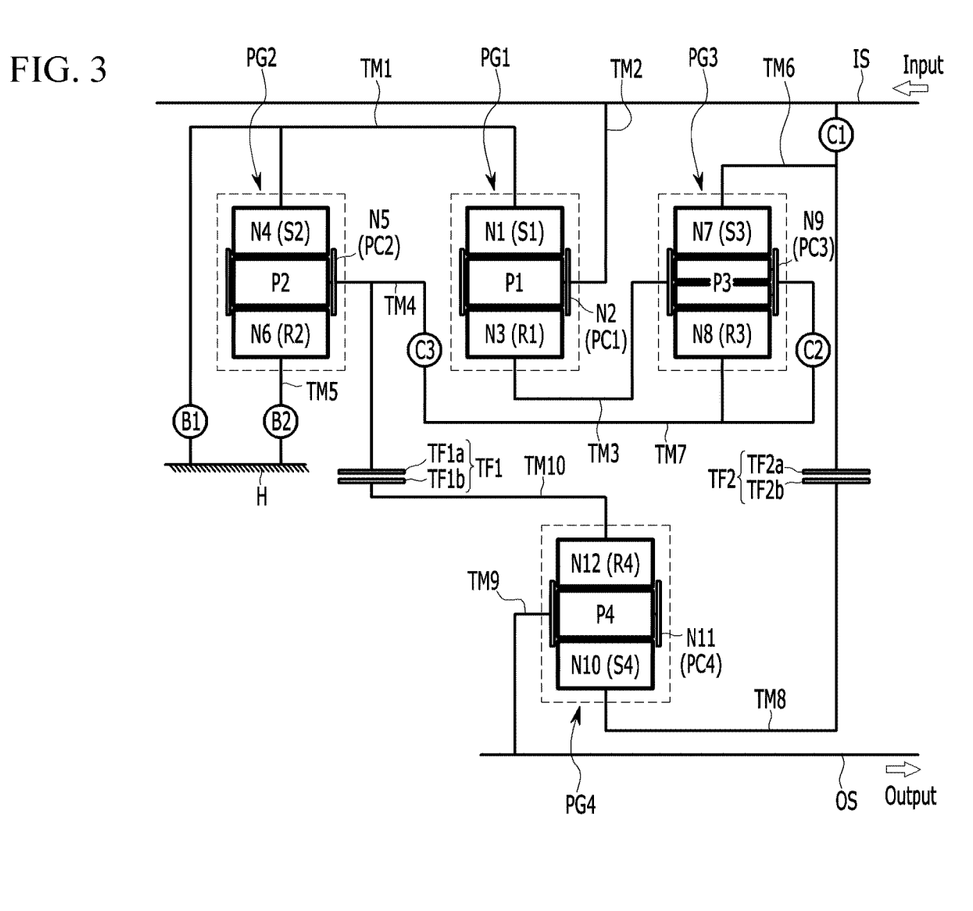
FIG. 3 is a schematic diagram of a planetary gear train according to a second exemplary form of the present disclosure.

FIG. 3 is a schematic diagram of a planetary gear train according to a second exemplary form of the present disclosure.

According to a planetary gear train according to a first exemplary form of the present disclosure, the second clutch C2 for unifying the third planetary gear set PG3 is arranged between the sixth shaft TM6 and the seventh shaft TM7 as shown in FIG. 1. However, in a planetary gear train according to a second exemplary form as illustrated in FIG. 3, the second clutch C2 is arranged between the third shaft TM3 and the seventh shaft TM7.

As a result, the second exemplary form shows the same function and operation, while being different from the first exemplary form in a mere location of the second clutch C2.

Figure 4:
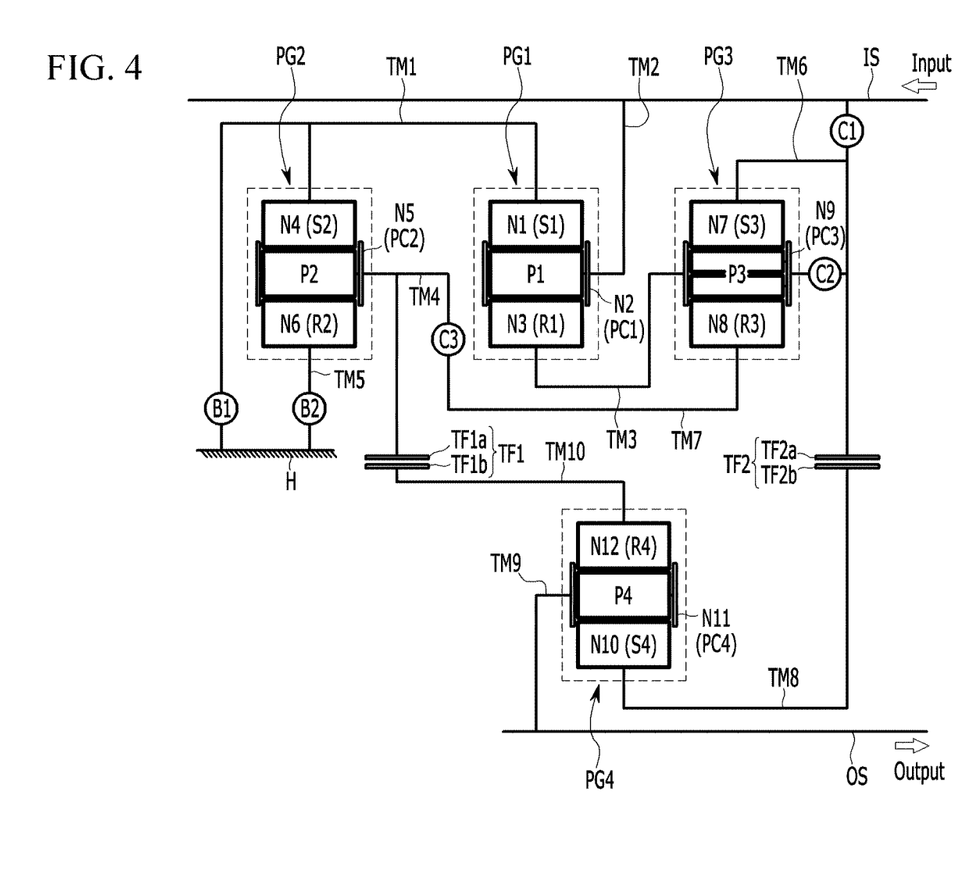
FIG. 4 is a schematic diagram of a planetary gear train according to a third exemplary form of the present disclosure.

FIG. 4 is a schematic diagram of a planetary gear train according to a third exemplary form of the present disclosure.

According to a planetary gear train according to a first exemplary form of the present disclosure, the second clutch C2 for unifying the third planetary gear set PG3 is arranged between the sixth shaft TM6 and the seventh shaft TM7 as shown in FIG. 1. However, in a planetary gear train according to a third exemplary form as illustrated in FIG. 4, the second clutch C2 is arranged between the third shaft TM3 and the sixth shaft TM6.

As a result, the third exemplary form shows the same function and operation, while being different from the first exemplary form in a mere location of the second clutch C2.

As described above, according to a planetary gear train according to an exemplary form of the present disclosure, at least eight forward speeds and at least one reverse speed may be realized by a combination of four planetary gear sets, two transfer gears, and five control elements, thereby providing improvement of power delivery performance and fuel consumption and improving installability by shortening the length of an automatic transmission.

In addition, according to a planetary gear train according to an exemplary form of the present disclosure, two transfer gears of external gears arranged on the output shaft OS are employed in addition to four planetary gear sets, and thus, gear teeth may be widely varied so as to easily achieve desired gear ratios and to easily comply with desired performance for respective vehicles.

In addition, according to a planetary gear train according to an exemplary form of the present disclosure, it is possible to realize at least eight forward speeds and at least one reverse speed, thereby increasing an engine driving efficiency.

In addition, the linearity of step ratios of shift stages is secured while multi-staging the shift stage with high efficiency, thereby making it possible to improve drivability such as acceleration before and after a gear shift, an engine speed rhythmic sense, and the like.

In addition, five control elements are applied to the planetary gear train according to an exemplary form of the present disclosure, thereby making it possible to reduce material cost due to reduction of constituent components, and reduce non-controlled control elements so as to reduce a drag torque, and improve a power transmission efficiency so as to reduce fuel consumption.

While this present disclosure has been described in connection with what is presently considered to be practical exemplary forms, it is to be understood that the present disclosure is not limited to the disclosed forms, but, on the contrary, is intended to cover various modifications and equivalent arrangements included within the spirit and scope of the present disclosure.

DESCRIPTION OF SYMBOLS

PG1, PG2, PG3, PG4 . . . first, second, third, fourth planetary gear sets
S1, S2, S3, S4 . . . first, second, third, fourth sun gears
PC1, PC2, PC3, PC4 . . . first, second, third, fourth planet carriers
R1, R2, R3, R4 . . . first, second, third, fourth ring gears
IS . . . input shaft
OS . . . output shaft
B1, B2 . . . first, second brakes
C1, C2, C3 . . . first, second, third clutches
TF1, TF2 . . . first, second transfer gears
TM1, TM2, TM3, TM4, TM5, TM6, TM7, TM8, TM9, TM10 . . . first, second, third, fourth, fifth, sixth, seventh, eighth, ninth, tenth shafts While this present disclosure has been described in connection with what is presently considered to be practical exemplary forms, it is to be understood that the present disclosure is not limited to the disclosed forms, but, on the contrary, is intended to cover various modifications and equivalent arrangements included within the spirit and scope of the present disclosure.

What is claimed is:

1. A planetary gear train of an automatic transmission for a vehicle, the planetary gear train comprising:
   a first planetary gear set having first, second, and third rotational elements;
   a second planetary gear set having fourth, fifth, and sixth rotational elements;
   a third planetary gear set having seventh, eighth, and ninth rotational elements;
   a fourth planetary gear set having tenth, eleventh, and twelfth rotational elements;
   an input shaft mounted with the first, second, and third planetary gear sets at an external circumference of the input shaft; and
   an output shaft disposed in parallel with the input shaft and mounted with the fourth planetary gear set on external circumference of the output shaft;
   a first shaft fixedly connected with the first rotational element and the fourth rotational element;
   a second shaft fixedly connected with the second rotational element and the input shaft;
   a third shaft fixedly connected with the third rotational element and the ninth rotational element;
   a fourth shaft fixedly connected with the fifth rotational element;
   a fifth shaft fixedly connected with the sixth rotational element;
   a sixth shaft fixedly connected with the seventh rotational element;
   a seventh shaft fixedly connected with the eighth rotational element;
   a eighth shaft fixedly connected with the tenth rotational element and externally engaged with the sixth shaft;
   a ninth shaft fixedly connected with the eleventh rotational element and the output shaft;
   a tenth shaft fixedly connected with the twelfth rotational element and externally engaged with the fourth shaft; and
   two transfer gears externally gear-meshed with the fourth and sixth shafts, respectively.

2. The planetary gear train of claim 1, wherein
   the first shaft selectively acts as a fixed element,
   the fifth shaft selectively acts as a fixed element,
   the sixth shaft is selectively connected with the input shaft, and
   the seventh shaft is selectively connected with the fourth shaft.

3. The planetary gear train of claim 1, wherein:
the first planetary gear set comprises a first sun gear as the first rotational element, a first planet carrier as the second rotational element, and a first ring gear as the third rotational element;
the second planetary gear set comprises a second sun gear as the fourth rotational element, a second planet carrier as the fifth rotational element, and a second ring gear as the sixth rotational element;
the third planetary gear set comprises a third sun gear as the seventh rotational element, a third ring gear as the eighth rotational element, and a third planet carrier as the ninth rotational element; and
the fourth planetary gear set comprises a fourth sun gear as the tenth rotational element, a fourth planet carrier as the eleventh rotational element, and a fourth ring gear as the twelfth rotational element.

4. The planetary gear train of claim 1, wherein:
the first, second, third planetary gear sets are arranged on the input shaft in the order of the third, first, and second planetary gear sets from an engine side.

5. The planetary gear train of claim 1, wherein the two transfer gears comprise: a first transfer gear arranged between the fourth shaft and the tenth shaft; and a second transfer gear arranged between the sixth shaft and the eighth shaft.

6. The planetary gear train of claim 1, wherein at least two rotational elements among the seventh, the eighth, and the ninth rotational elements of the third planetary gear set are selectively connected to each other such that all rotational elements of the third planetary gear set integrally rotate.

7. The planetary gear train of claim 6, further comprising:
a first clutch arranged between the input shaft and the sixth shaft;
a second clutch arranged between the sixth shaft and the seventh shaft;
a third clutch arranged between the fourth shaft and the seventh shaft;
a first brake arranged between the first shaft and a transmission housing; and
a second brake arranged between the fifth shaft and the transmission housing.

8. The planetary gear train of claim 6, further comprising:
a first clutch arranged between the input shaft and the sixth shaft;
a second clutch arranged between the third shaft and the seventh shaft;
a third clutch arranged between the fourth shaft and the seventh shaft;
a first brake arranged between the first shaft and a transmission housing; and
a second brake arranged between the fifth shaft and the transmission housing.

9. The planetary gear train of claim 6, further comprising:
a first clutch arranged between the input shaft and the sixth shaft;
a second clutch arranged between the third shaft and the sixth shaft;
a third clutch arranged between the fourth shaft and the seventh shaft;
a first brake arranged between the first shaft and a transmission housing; and
a second brake arranged between the fifth shaft and the transmission housing.

10. A planetary gear train of an automatic transmission for a vehicle, the planetary gear train comprising:
a first planetary gear set having first, second, and third rotational elements;
a second planetary gear set having fourth, fifth, and sixth rotational elements;
a third planetary gear set having seventh, eighth, and ninth rotational elements;
a fourth planetary gear set having tenth, eleventh, and twelfth rotational elements;
an input shaft mounted with the first, second, and third planetary gear sets at an external circumference of the input shaft; and
an output shaft disposed in parallel with the input shaft and mounted with the fourth planetary gear set on external circumference of the output shaft,
wherein the first rotational element is fixedly connected with the fourth rotational element,
the second rotational element is fixedly connected with the input shaft,
the third rotational element is fixedly connected with the ninth rotational element,
the fifth rotational element is externally gear-meshed with the twelfth rotational element through a first transfer gear,
the seventh rotational element is externally gear-meshed with the tenth rotational element through a second transfer gear, and
the eleventh rotational element is fixedly connected with the output shaft.

11. The planetary gear train of claim 10, wherein
the first planetary gear set includes a first sun gear as the first rotational element, a first planet carrier as the second rotational element, and a first ring gear as the third rotational element;
the second planetary gear set includes a second sun gear as the fourth rotational element, a second planet carrier as the fifth rotational element, and a second ring gear as the sixth rotational element;
the third planetary gear set includes a third sun gear as the seventh rotational element, a third ring gear as the eighth rotational element, and a third planet carrier as the ninth rotational element;
the fourth planetary gear set includes a fourth sun gear as the tenth rotational element, a fourth planet carrier as the eleventh rotational element, and a fourth ring gear as the twelfth rotational element.

12. The planetary gear train of claim 10, wherein
the first, second, third planetary gear sets are arranged on the input shaft in the order of the third, first, and second planetary gear sets from an engine side.

13. The planetary gear train of claim 10, wherein
the second rotational element is selectively connected with the seventh rotational element,
the fifth rotational element is selectively connected with the eighth rotational element,
the fourth rotational element is selectively connected with a transmission housing,
the sixth rotational element is selectively connected with the transmission housing,
two rotational elements among the seventh, the eighth, and the ninth rotational elements of the third planetary gear set are selectively connected to each other.

14. The planetary gear train of claim 13, wherein the first transfer gear is arranged between the fifth rotational element and the twelfth rotational element; and
the second transfer gear is arranged between the seventh rotational element and the tenth rotational element.

15. The planetary gear train of claim 13, further comprising
- a first clutch configured to selectively connect the second rotational element and the seventh rotational element;
- a second clutch configured to selectively connect the seventh rotational element and the eighth rotational element;
- a third clutch configured to selectively connect the fifth rotational element and the eighth rotational element;
- a first brake configured to selectively connect the fourth rotational element and the transmission housing; and
- a second brake configured to selectively connect the sixth rotational element and the transmission housing.

16. The planetary gear train of claim 13, further comprising:
- a first clutch configured to selectively connect the second rotational element and the seventh rotational element;
- a second clutch configured to selectively connect the eighth rotational element and the ninth rotational element;
- a third clutch configured to selectively connect the fifth rotational element and the eighth rotational element;
- a first brake configured to selectively connect the fourth rotational element and the transmission housing; and
- a second brake configured to selectively connect the sixth rotational element and the transmission housing.

17. The planetary gear train of claim 13, further comprising:
- a first clutch configured to selectively connect the second rotational element and the seventh rotational element;
- a second clutch configured to selectively connect the seventh rotational element and the ninth rotational element;
- a third clutch configured to selectively connect the fifth rotational element and the eighth rotational element;
- a first brake configured to selectively connect the fourth rotational element and the transmission housing; and
- a second brake configured to selectively connect the sixth rotational element and the transmission housing.

* * * * *